(12) United States Patent
Berry et al.

(10) Patent No.: US 11,187,542 B2
(45) Date of Patent: Nov. 30, 2021

(54) TRAJECTORY TIME REVERSAL

(71) Applicant: HERE Global B.V., Eindhoven (NL)

(72) Inventors: Tessa Berry, Naperville, IL (US); Matei Stroila, Chicago, IL (US); Onur Derin, Eindhoven (NL); Bo Xu, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 138 days.

(21) Appl. No.: 16/286,065

(22) Filed: Feb. 26, 2019

(65) Prior Publication Data
US 2020/0271458 A1 Aug. 27, 2020

(51) Int. Cl.
*G01C 21/34* (2006.01)

(52) U.S. Cl.
CPC ......... *G01C 21/34* (2013.01); *G01C 21/3415* (2013.01)

(58) Field of Classification Search
None
See application file for complete search history.

(56) References Cited

U.S. PATENT DOCUMENTS

| | | | |
|---|---|---|---|
| 8,918,282 B1 | 12/2014 | Stenneth | |
| 9,911,332 B1 | 3/2018 | Dorum | |
| 10,073,908 B2 | 9/2018 | Bak | |
| 2017/0169297 A1 | 6/2017 | Bernal | |
| 2017/0178499 A1 | 6/2017 | Dong | |
| 2018/0066957 A1 | 3/2018 | Stroila | |
| 2020/0133269 A1* | 4/2020 | Wang | ........... G06K 9/6218 |

OTHER PUBLICATIONS

Hunter, Timothy, Pieter Abbeel, and Alexandre Bayen. "The path inference filter: model-based low-latency map matching of probe vehicle data." IEEE Transactions on Intelligent Transportation Systems 15.2. Jun. 20, 2012. (pp. 1-23).
Magdy, Nehal, Mahmoud A. Sakr, Tamer Mostafa, and Khaled El-Bahnasy. "Review on trajectory similarity measures." In 2015 IEEE Seventh International Conference on Intelligent Computing and Information Systems (ICICIS). IEEE. Dec. 12, 2015. (pp. 613-619).
Wang, Sheng, Zhifeng Bao, J. Shane Culpepper, Zizhe Xie, Qizhi Liu, and Xiaolin Qin. "Torch: A Search Engine for Trajectory Data." In SIGIR. Jun. 27, 2018. (pp. 535-544).
U.S. Appl. No. 15/965,527, filed Apr. 27, 2018.

* cited by examiner

*Primary Examiner* — Jonathan M Dager
*Assistant Examiner* — Garrett F Evans
(74) *Attorney, Agent, or Firm* — Lempia Summerfield Katz LLC

(57) ABSTRACT

An apparatus and methods provide trajectory data for a geographic area. Multiple probe data sets are received or identified from one or more mobile devices. The probe data sets include time values in a first sequence associated with location values in the first sequence. At least one of the probe data sets is modified to reverse the location values such that the modified probe data set includes time values in a first sequence associated with location values in a second sequence. A location clustering algorithm is performed on the plurality of probe data sets and the modified probe data set based on the location values.

18 Claims, 11 Drawing Sheets

TRAJECTORY TIME REVERSAL

FIELD

The following disclosure relates to probe trajectories, and more particularly, the modification of distancing and clustering algorithms for trajectory bundling.

BACKGROUND

A probe may be a device for collecting location data, for example, using the Global Positioning System (GPS) or another global navigation satellite system (GNSS). Maps may be created using the location data. Location-based services control features of an application based on location information from a GNSS or another source. A trajectory is a set of probe data that traces a path through a geographic location.

Many algorithms for map making and location based services require high amounts of probe data. For instance, algorithms that detect map features from probe trajectories can suffer significantly from low statistics in a single direction of travel along the road network. Also, algorithms for probe anonymization may need many dummy trajectories to create ambiguity in mixed zones.

The following embodiment provide techniques to increase the number of trajectories in a set of probe data.

SUMMARY

In one embodiment, a method for providing trajectory data for a geographic area includes receiving a plurality of probe data sets from one or more mobile devices, wherein the probe data sets include time values in a first sequence associated with location values in the first sequence, modifying, using a processor, at least one of the plurality of probe data sets to reverse the location values or the time values such that the modified probe data set includes time values in a first sequence associated with location values in a second sequence, performing, using the processor, a location clustering algorithm on the plurality of probe data sets and the modified probe data set according to the location values.

In another embodiment, an apparatus for providing trajectory data for a geographic area may include a probe data receiver and a reverse trajectory generator. The probe data receiver is configured to identify a plurality of probe data sets from one or more mobile devices. The probe data sets include time values in a first sequence associated with location values in the first sequence. The reverse trajectory generator is configured to modify at least one of the plurality of probe data sets to reverse the location values such that the modified probe data set includes time values in a first sequence associated with location values in a second sequence.

In another embodiment, a non-transitory computer readable medium includes instructions that when executed by a process perform receiving initial trajectories having time values associated with location values, performing a location clustering algorithm on the initial trajectories, calculating a confidence level based on a result of the location clustering algorithm, performing a comparison of the confidence level to a threshold, modifying, in response to the comparison, at least one of the initial trajectories to reverse the location values or the time values in a reversed trajectory, and providing the initial trajectories and the reversed trajectory.

BRIEF DESCRIPTION OF THE DRAWINGS

Exemplary embodiments of the present invention are described herein with reference to the following drawings.

DETAILED DESCRIPTION

Figure 1:
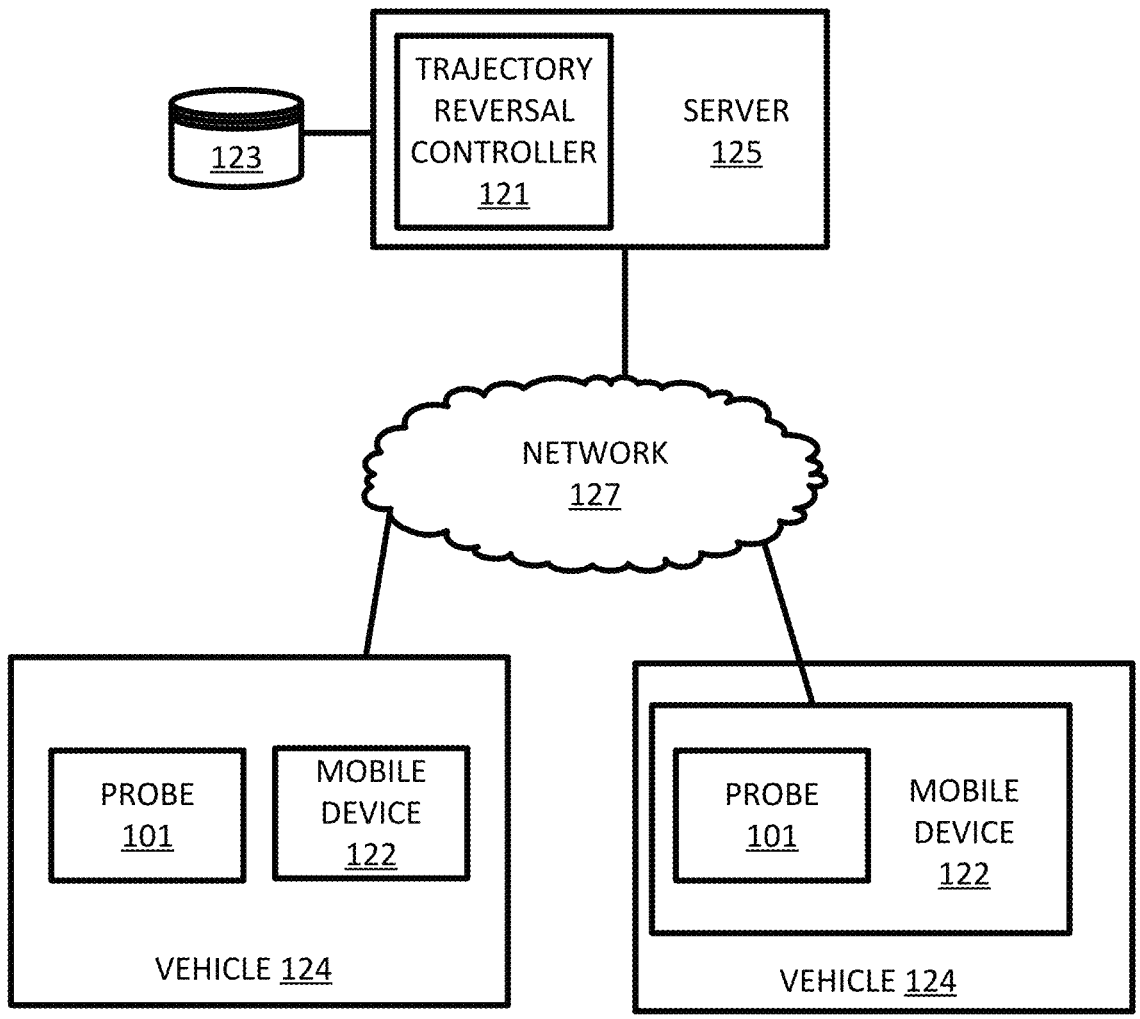
FIG. 1 illustrates an example system for trajectory reversal.

Location information is detected and stored by a variety of devices. Primarily, mobile devices such as automobiles or other vehicles, mobile phones or smart phones are continuously or semi-continuously (e.g., at frequent intervals such as at a sampling rate) determining the current positions of the device and reporting the location information. The location information may be logged for use by many different entities. Social media applications may track users for the purpose of identifying contacts or places to visit and may provide content in response to location. Mapping and navigation application provide turn-by-turn directions or maps based on the location information. Crowd sourcing applications provide reviews on products or points of interest (POIs) according to location information.

In many instances, probe data is organized and stored in probe trajectories. A trajectory may be a sample sequence of location data paired with time data. For example, a trajectory may be a sample sequence of locations paired with associated timestamps, such as $(p_1, t_1), (p_2, t_2), \ldots (p_n, t_n)$ with timestamps in an ascending order $t_1 \leq t_2 \leq \ldots \leq t_n$, indicating that a moving object (e.g., vehicle or pedestrian) is at position $p_1$ at time $t_1$, at position $p_2$ at time $t_2$, and so on. Each of the positions $p_n$ may be defined by two coordinates (longitude, latitude) or by three coordinates (longitude, latitude, altitude). Each of the positions $p_n$ may be defined according to a distance along a road segment or path. The trajectory may be stored as an array of timestamps and location stamps (e.g., $[(p_1, t_1), (p_2, t_2), (p_3, t_3), (p_4, t_4)]$) or the trajectory may be stored as an array of location stamps (e.g., $[p_1, p_2, p_3, p_4]$) such that the order of the location stamps implies the associated time intervals in a predetermined set of time values.

As trajectories are recorded, the number of trajectories available at any particular geographic area and/or during any particular time range are limited to the number of devices, or compatible devices, that travel in the geographic area and/or during the time range. Compatible devices may be devices configured to communicate and report trajectories to a central device. Compatible devices may be devices associated with a particular manufacturer of vehicle.

Some geographic areas may have many devices that traverse paths within the area that produce multiple trajectories. An example may be a roadway where dozens to hundreds of vehicles pass every hour. Other geographic areas may have limited device traversal and thus fewer trajectories are produced. An example may be a parking lot where minutes or hours may pass between vehicles traversing the entrance. Various applications for the trajectories, such as the detection of map features and anonymization of probes, require a minimum number of trajectories. If too few observations are recorded for a map feature, the map cannot be updated with a statistical confidence high enough to justify the change. Likewise, a probe cannot be adequately anonymized if there are too few trajectories in the particular area. The following embodiments include devices and techniques for increasing the quantity of trajectories available for a given geographic area and/or time interval.

The following embodiments relate to several technological fields including but not limited to navigation, autonomous driving, assisted driving, traffic applications, and other location-based systems. The following embodiments achieve advantages in each of these technologies because the extent of the geographic area that accurate data can be provided to applications or third parties while maintaining the requisite security and privacy is improved. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in the data security.

FIG. 1 illustrates an example system for trajectory reversal. In FIG. 1, one or more vehicles 124 are connected to the server 125 though the network 127. The server 125 may include a trajectory reversal controller 121. The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 122 may be standalone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
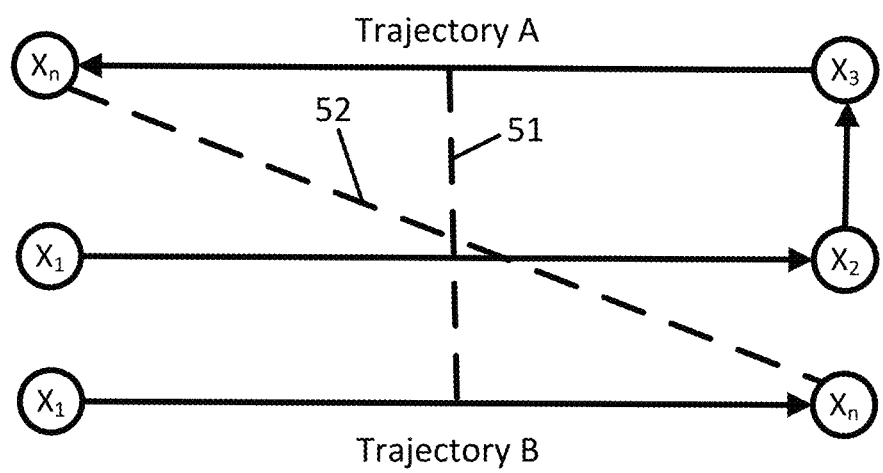
FIG. 2 illustrates an example comparison of trajectories using two comparison techniques.

FIG. 2 illustrates an example comparison of trajectories using two comparison techniques or similarity measures. The similarity of two trajectories may be defined as the inverse of the distance between the two trajectories. The similarity of two trajectories of objects may be defined as the cost of transforming one of the objects to the path of the object based on distance (e.g., a distance function or a distance measure). The distance function or distance measure may determine the distance between trajectories through aligned respective pairs of the location data or elements of the trajectories. That is, distance is measured by aligning the first element of the first trajectory with the first element of the second trajectory, the second element of the first trajectory with the second element of the second trajectory, and so on such that the $i^{th}$ element of the first trajectory is aligned with the $i^{th}$ element of the second trajectory. Alternatively, the elements of the first trajectory may be aligned to the closest corresponding element in the second trajectory. For example, local time shifting may be performed, in which one element of the first trajectory is shifted in time to better match an element in the second trajectory when the two matched elements are in different data locations in the trajectories.

The similarity measures can be categorized into two categories (1) order-unconstrained similarity that focuses on similarity of geometric shapes and substantially or completely ignores the time order of sample positions; and (2) order-constrained similarity that takes into account both the similarity of geometric shapes and the time order of sample positions. Order-constrained similarity may be preferable to order-unconstrained in some instances because the order-constrained similarity reflects the route of the trajectories. This is illustrated, by FIG. 2, for an order-unconstrained similarity measure (i.e., the Hausdorff distance) between trajectories A and B as illustrated by dotted line 51 and an order-constrained similarity measure (i.e., the Fréchet distance) between trajectories A and B as illustrated by dotted line 52.

These measures of similarity between curves either do not impose the monotonicity constraint at all (such as the Hausdorff distance), or if they impose the monotonicity constraint then they are direction sensitive (such as the Fréchet distance). However, in some applications, it is desirable to have a curve distance measure that preserves monotonicity yet is not sensitive to moving directions. For example, identification of frequently used vehicle routes between a residential area and a business area may be sought regardless of whether the route is from the residential area to the business area or the other way around. In this case, since vehicles cannot move backward in a road network, it is natural to impose the monotonicity constraint. Thus, the Hausdorff distance is not a suitable similarity measure. The Fréchet distance is not a suitable measure either because it leads to a large distance between the trajectories that travel along the same route but in opposite directions. To solve the above problem, the disclosed embodiments propose a curve similarity measure that is both monotonicity-preserving and direction-agnostic, which may be referred to as a bi-directional similarity measure or a bi-directional Fréchet distance.

FIG. 2 illustrates trajectory A that extends from a sequence of points $X_1$, $X_2$, $X_3$, and $X_n$ and trajectory B extends from a sequence of points $X_1$ to $X_n$. The Hausdorff distance 51 describes how far two subsets of a metric space are from each other. For example, the Hausdorff distance 51 may measure the greatest of all the distances from a point in one set to the closest point in the other set. The Fréchet distance 52 is a measure of distances between the two subsets and considers ordering of the points along the curves. That is, the Fréchet distance 52 compares the distance between the $i^{th}$ elements of the trajectories A and B. The Fréchet distance 52 represents the shortest distance between a first curve and a second curve at similar points along the curves by taking into account the location and ordering of the points along the curves (e.g., by not allowing backtracking at any points at which the first curve and the second curve are coupled).

The trajectories may traverse any type of path in the geographic region. The trajectories may be vehicle trajectories that traverse driving paths. The driving paths may be roadways or other paths for vehicles through secondary driving areas. Secondary driving areas may include parking lots, driveways, alleys, fields, or other areas.

In addition, the trajectories may be used to detect map features. A map feature may be the geometry and shape of the path for the vehicle. The map features may include the possible driving maneuvers (e.g., turns, U-turns, etc.) at locations along the path. The map feature may also include buildings, curbs, signs, or other objects in the vicinity of the path of the vehicle. In addition, traffic features may be detected from analysis of the trajectories, such as probabilities that a particular turn or highway interchange is traversed, delays at locations along the path, and whether there are points of interest that are impacting traffic.

The server 125 may receive trajectories from vehicles 124 and cluster the trajectories in order to identify map features. The clustering may group together trajectories according to similarity measure. In one embodiment, given a time range for the timestamps and a location range for the geographic coordinates of the roadway, path, intersection, highway interchange, or other location, the server 125 identifies and extracts corresponding probe data. That is, all of the trajectories having a similarity measure greater than a predetermined threshold with each other are clustered together. The similarity measure may be an order-constrained similarity that takes into account both the similarity of geometric shapes and the time order of sample positions.

In one embodiment, the clustering method groups trajectories together into trajectory bundles based on one or more characteristics of the trajectories. In one embodiment, the similarities of the curves (e.g., discrete Fréchet distances) represented by each trajectory can be used to cluster into trajectory bundles. For example, clustering results in creating trajectory bundles are composed of those trajectories that have similar curve shapes (e.g., have discrete Fréchet distances below a clustering threshold) and/or other similar trajectory properties (e.g., heading, speed, etc.). Examples of clustering methods that can be used with the embodiments described here include, but are not limited to, Density-Based Spatial Clustering of Applications with Noise (DBSCAN), Ordering Points to Identify the Clustering Structure (OPTICS), spectral clustering, and other examples.

Figure 3A:
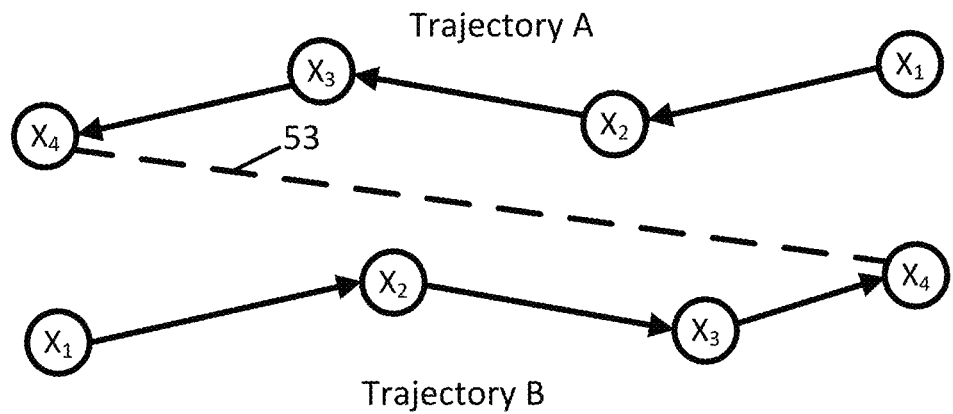
FIG. 3A illustrates an example trajectory comparison using location and ordering.

FIG. 3A illustrates an example trajectory comparison using location and ordering. Dotted line 53 illustrated an order-constrained similarity that takes into account both the similarity of geometric shapes and the time order of sample positions. Under an order-constrained similarity measure, the distance between two trajectories is small only if their geometric shapes are similar and their travel directions are consistent. As a result, the trajectories that follow the same route but travel in opposite directions have large distances, as illustrated in FIG. 3A, under these measures, and therefore are likely to be grouped into different clusters.

In some examples, a map feature may not have enough associated trajectories to make a determination for the detected characteristic of the map feature. If not enough trajectories are available, the shape of the road, location of the road, or other characteristic cannot be determined. For example, when too few trajectories are included the characteristic cannot be determined with sufficient level of statistical certainty or confidence.

This phenomenon may be particularly present for geographic areas that have designated entrances that are spaced apart from each other. When the entrance and exit are spaced apart, corresponding trajectories may not be clustered together and the number of available trajectories is limited. This phenomenon may be present in a geographic area such as a point of interest. For example, the trajectories that enter a parking lot and the trajectories that exit the parking lot at the same gate may be grouped into two different clusters. The implication to map feature detection is that the resulted clusters may not have enough trajectories to compute an accurate location of the entrance/exit. Or there are simply not enough trajectories to form an entering or exiting cluster at all, which may result in the entrance or exit not being detected.

Figure 3B:
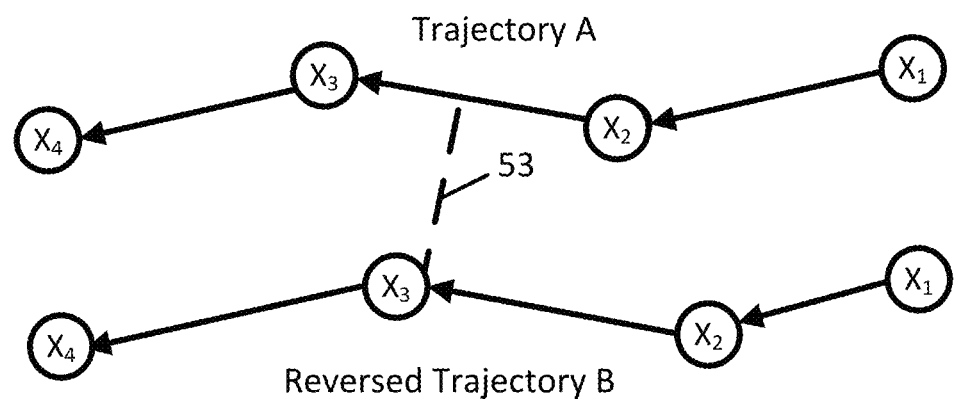
FIG. 3B illustrates the example trajectory comparison of FIG. 3A with a reversed trajectory.

FIG. 3B illustrates the example trajectory comparison of FIG. 3A with a reversed trajectory. For a given trajectory $[(p_1, t_1), (p_2, t_2), (p_3, t_3), (p_4, t_4)]$, a reversed trajectory changes the order of the location stamps or the timestamps. For example, the reversed trajectory may be $[(p_4, t_1), (p_3, t_2), (p_2, t_3), (p_1, t_4)]$. As illustrated in FIGS. 3A and 3B the direction of the trajectory is reversed. In another example, the time stamps associated with the locations may be changed to modify the trajectory to a reversed trajectory. As shown by the dotted line 53, the reversed trajectory B has a much shorter order-constrained similarity (e.g., Fréchet distance) with trajectory A. The server 125 may bundle or cluster the reversed trajectory B with trajectory A because of the reduced similarity measure. Thus, for the limited example of FIGS. 3A and 3B, when the set of probe data includes trajectory A and trajectory B, no clusters may be formed. However, when the set of probe data includes trajectory A, trajectory B, and reversed trajectory B, a bundle or cluster is formed with trajectory A and reversed trajectory B.

An example may include probe data collected by vehicles 124 and analyzed at server 125 by the trajectory reversal controller 121. The trajectory reversal controller 121 receives the probe data and identifies a set of standard trajectories and a set of reversed trajectories. The set of reversed trajectories may be derived from the set of standard trajectories. For example, the reversed trajectories may include location values or time values that are reversed in order. The trajectory reversal controller 121 creates one or more clusters from the standard trajectories and the reversed trajectories based on an order-constrained similarity. For example, the distances of each of the standard trajectories and each of the reversed trajectories may be compared to one or more distance thresholds. The trajectory reversal controller 121 may identify at least one cluster that includes both a standard trajectory and a reversed trajectory. As described in more detail below, the server 125 may perform anonymization or calculate a map feature in response to the at least one cluster that includes both a standard trajectory and a reversed trajectory.

Figure 4:
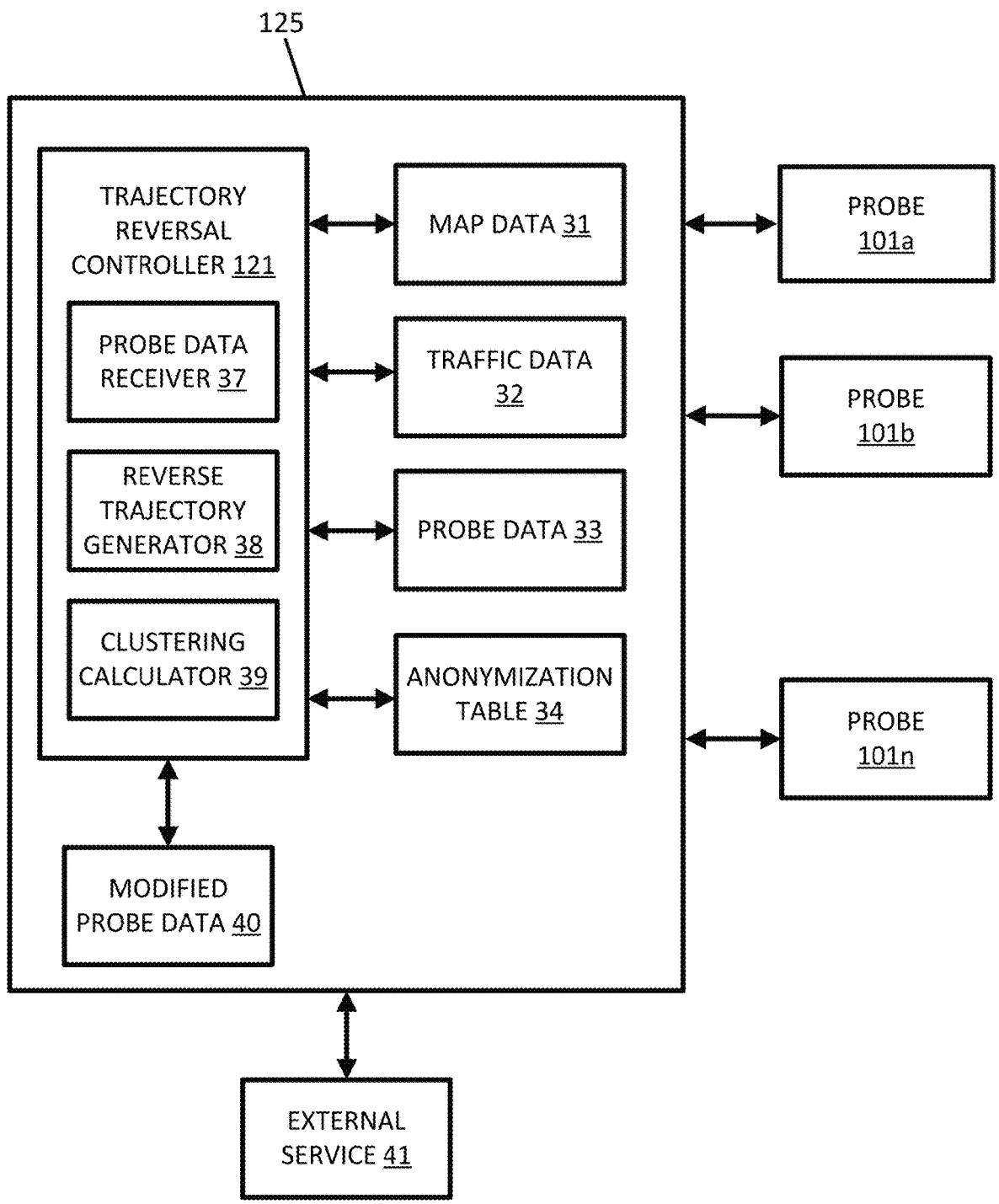
FIG. 4 Illustrates an example system for trajectory reversal.

FIG. 4 illustrates an example system for trajectory reversal. The trajectory reversal controller 121 may include a probe data receiver 37, a reverse trajectory generator 38, and a clustering calculator 39. The trajectory reversal controller 121 receives at least probe data 33 from one or more probes 101a-n. The trajectory reversal controller 121 may perform internal calculations based on modified probe data 40 including trajectory reversals or output the modified probe data 40 to an external device or service 41. The map data 31, traffic data 32, anonymization table 34, and modified probe data 40 may be outputs of the trajectory reversal controller 121 and may be provided individually or in combination. Additional, different, or fewer components may be included.

The probe data receiver 37 is configured to identify probe data sets (e.g., probe data 33) from one or more mobile devices 122. The probe data sets are organized as trajectories. The probe data sets may be defined according to the collecting device. Each probe data set may include an identifier that identifies a mobile device 122, a vehicle 124, or a user thereof. The identifier may include an alphanumeric code, a username, or a device identifier such as a machine address control (MAC) address.

The probe data sets or trajectories may be in an array that includes time values in a first sequence and location values in the first sequence. The first sequence may be the order in which the probe data was collected. That is, the first sequence may be the same as the direction of travel for the collecting device of the probe data set. Thus, the sequence for the location values is in the direction of travel and the sequence for the time value is increasing in time. The probe data sets or trajectories may have a quantity that is the same as the number of collecting device. The probe data sets may be divided over time (e.g., a new trajectory is started every predetermined time period).

The reverse trajectory generator 38 is configured to modify at least one of the probe data sets to reverse the location values such that the modified probe data set includes time values in a first sequence associated with location values in a second sequence. Location values may be paired with time values that do not correspond with the time when the location values were collected. The first sequence may be opposite the second sequence. That is, location values may be listed in order that is reverse to the order that the path was traversed in collecting the probe data set. For example, the time values may increment from $t_1$ to $t_n$ in the original trajectory and be reversed to $t_n$ to $t_1$ in the reversed trajectory.

In another example, the reverse trajectory generator 38 may calculate the time values for the reverse trajectories based on the time values in the original trajectories. For example, the time values from the original trajectory are normalized and scaled to a decimal value. The time values for the reverse trajectory are calculated from the normalized values.

In any of these examples, the reverse trajectory generator 38 increases the quantity for the trajectories. In one example, where each of the probe data sets are reversed, the reverse trajectory generator 38 doubles the quantity for the trajectories. In another example, the reverse trajectory generator 38 may reverse fewer than all of the trajectories, resulting in less than a doubling of the quantity of the trajectories.

The reverse trajectory generator 38 may select the trajectories to reverse based on geographic area, the quantity of available trajectories, a point of interest, or a confidence level. The reverse trajectory generator 38 may compare the trajectories to geographic areas designated for trajectory reversals. Example designated geographic areas may be based on geographic coordinates set by a user.

Example designated geographic areas may be based on roadway features of roadways. Some types or functional classifications of roadways naturally are traversed by few vehicles and are associated with a low number of trajectories. Detection of roads, turns, and associated points of interest at such low statistic regions may be improved by increasing the number of trajectories. The roadway features may include the number of lanes, the width of the lanes, the functional classification of the road, or other features that describe the road represented by the road segment. The functional classifications of roads may include different levels accessibility and speed with may be associated with the number of trajectories. An arterial road has low accessibility but is the fastest mode of travel between two points and may be associated with many trajectories. Arterial roads are typically used for long distance travel. Collector roads connect arterial roads to local roads. Collector roads are more accessible and slower than arterial roads. Local roads are accessible to individual homes and business. Local roads are the most accessible type of road and may include the fewest trajectories. As an example, FC5 roads, local roads, or parking lot roads may not include enough trajectories for these tasks.

The reverse trajectory generator 38 may compare the quantity of available trajectories. The reverse trajectory generator 38 may determine the number of trajectories collected by the mobile devices 122. The reverse trajectory generator 38 may compare the number of trajectories to a threshold value. When the number of trajectories is less than the threshold value, the reverse trajectory generator 38 selects one or more trajectories for reversal. The reverse trajectory generator 38 may calculate a number of trajectories for reversal based on the difference between the number of trajectories and the threshold value. For example, more trajectories are selected for reversal when the difference between the number of trajectories and the threshold value is greater.

The reverse trajectory generator 38 may compare a point of interest to a set of designated points of interest. The designated points of interest may be points of interest that may have separated entrances and exits. Example designated points of interest may include parking lots and parking garages.

When using a direction based or time-series based trajectory clustering or bundling algorithm, trajectories running in the opposite direction will be separated into different clusters. However, the presence of these opposite trajectories could actually improve the confidence in the total cluster. By reversing the trajectories in time, the confidence of the cluster is improved.

The clustering calculator 39 is configured to perform a location clustering algorithm on the probe data sets and the modified probe data set according the location values. The location clustering algorithm computes similarities among the trajectories. Mathematically, the comparison may be based on the curves or piecewise geometries that represent the trajectories. As discussed above, the location clustering algorithm may use any clustering method to create the bundles and to group like trajectories within those bundles. Examples of these clustering methods include but are not limited to DBSCAN, OPTICS, spectral clustering, and the like. For example, DBSCAN is a clustering method designed for large databases where, e.g., minimal domain knowledge is needed from input parameters.

The clustering calculator 39 is configured to initially perform the location clustering algorithm on the probe data sets and calculate a confidence level based on a result of the location clustering algorithm. In general, then using a clustering algorithm, the more points available in that algorithm, the higher the confidence level and better the result of that clustering. The confidence level may be determined based on a statistical measure of the probe data sets. For example, the similarities among the trajectories may be compared. The clustering calculator 39 may calculate a standard deviation or variance of the trajectories that make up a cluster. The clustering calculator 39 is configured to compare the confidence level to a threshold, and in response to the confidence level being less than the threshold, generating an instruction for the reverse trajectory generator to modify at least one of the probe data sets to reverse the location values. The clustering calculator 39 may monitor the confidence level of a cluster and reverse trajectories in the cluster, which are added to the cluster, until the confidence level of the cluster reaches the confidence threshold.

More specifically, the clustering calculator 39 may perform an initial location clustering algorithm on the original trajectories collecting by the mobile devices 122 using an order-constrained distance measure. The clustering calculator 39 clusters multiple trajectories together. When the number of clusters in the cluster meets at least a baseline threshold, the clustering calculator 39 calculates a standard deviation of the cluster.

In one example, when the standard deviation and/or the quantity of clusters meets a confidence level required to indicate that the cluster adequately describes the geographic area traversed by the trajectories, the clustering calculator 39 may generate a clustering success or clustering acknowledgment message that indicates that the trajectories are sufficient for further analysis (e.g., anonymization or map feature detection).

However, when the standard deviation and/or the quantity of clusters does not meet the confidence level required to indicate that the cluster adequately describes the geographic area traversed by the trajectories, the clustering calculator 39 may generate a trajectory reversal message that instructs the reverse trajectory generator 38 to reverse one or more of the trajectories and increase the quantity of trajectories in the cluster. In result of the reverse trajectories, the clustering calculator 39 clusters additional trajectories together. When the increased number of clusters in the cluster meets at least a baseline threshold, the clustering calculator 39 calculates a standard deviation of the increased cluster. The clustering calculator 39 calculates an improved confidence level, which is greater than the previous confidence level, based on location clustering algorithm on the original trajectories and reversed trajectories. Again, when the standard deviation and/or the quantity of clusters meets a confidence level required to indicate that the cluster adequately describes the geographic area traversed by the trajectories, the clustering calculator 39 may generate a clustering success or clustering acknowledgment message that indicates that the trajectories are sufficient for further analysis (e.g., anonymization or map feature detection). If not, the process may repeat one or more times until the confidence level threshold is met.

The trajectory reversal controller 121 may also include an anonymity generator configured to assign identifiers to the trajectories including the probe data sets and the modified probe data set. The anonymization table 34 may store the assigned identifiers for the trajectories. The anonymization of the plurality of probe data sets is increased by the modified probe data set. The identifiers may be encrypted or otherwise modified to hide the identity of the collection device (e.g., mobile device 122 or vehicle 124). The identifiers may be pseudonyms assigned to the trajectories when the trajectory, or the corresponding mobile device 122 or vehicle 124, enters a mix zone or passes a mix zone boundary. A pseudonym generator may select a pseudonym for the probe 101 in response to the location of the probe data. The pseudonym is an identifier that was not previously associated with the probe. The pseudonym may be a number or an alphanumeric code. The pseudonym generator 38 may assign numeric codes from 1 or another value that increment according to a clock or sequentially. The pseudonym is not the identifier that is associated with the probe prior to entering the mix zone.

If only one trajectory is present in the mix zone, it is difficult to protect the identity of the probe 101. If the log of trajectories or related data is subjected to unauthorized access, the anonymity of a single probe may be compromised. In addition to this simple example, when too few trajectories are present in the mix zone, a similar security weakness may be present. However, according to the disclosed embodiments, security is improved by increasing the number of trajectories from trajectory reversal. The reversed trajectories may be considered artificial trajectories or dummy trajectories generated for the purpose of increasing the anonymity of the mix zone. The artificial trajectories, or dummy trajectories, may be a set of data included in the probe data that does not originate with measurements takes at a mobile device 122 or vehicle 124.

The anonymity generator may detect the anonymity available in the mix zone and adjust the anonymity level by generating a trajectory reversal message that instructs the reverse trajectory generator 38 to reverse one or more of the trajectories and increase the quantity of trajectories in the cluster. The anonymity generator may calculate an anonymity level and compare the anonymity level to a threshold level. When the anonymity level is below a threshold, the anonymity generator may cause trajectories to be reversed to increase the quantity of trajectories in the mix zone and increase the anonymity level. In addition, the anonymity generator may adjust the shape and/or size of the mix zone based on anonymity. When the anonymity level is below a threshold, the anonymity generator may adjust the mix zone boundary and/or the size of the mix zone in response to the comparison.

The anonymity level may be a K-anonymity. The K-anonymity ensures that in a set of k probes, the target object is indistinguishable from the other k-1 probes. The probability to identify the target probe is 1/k. The anonymity generator may calculate the anonymity level.

The anonymity generator generates the anonymization table 34 including pseudonyms for the trajectories based on the original trajectories and the reversed trajectories. The anonymization table 34 may be provided to a map application, navigation application, social media application, advertising application, game application, or another external service 41.

The trajectory reversal controller 121 may also include a map feature generator configured to generate a map feature in response to the trajectories including the probe data sets and the modified probe data set and store the map feature in the geographic database 123. The generated map feature may be included in map data 31 and provided to the geographic database 123. The operation of the map feature generator, i.e., the ability to identify map features from the clusters, is improved by the availability of the reversed trajectories. An increased number of clusters means increased reliability of the map feature process.

The map feature generator may determine a confidence level for generating a map feature from the clustered trajectories. The trajectory reversal controller 121 may calculate the confidence level according to the type of map features. For example, the location of a point of interest may be identified with only a low confidence level, but the shape of an intersection may require a high confidence level. When the confidence level for a map feature is below a threshold, the map feature generator may cause trajectories to be reversed to increase the quantity of trajectories in the mix zone and increase the anonymity level. For example, the map feature generator may send a message to the reverse trajectory generator 38 to reverse trajectories and increase the number of trajectories in the analysis for identification of map features.

In one embodiment, the trajectory reversal controller 121 uses the trajectory clusters and/or the possible maneuvers that they represent to generate a map of the geographic area (e.g., mapping paths through an intersection or interchange) even when the underlying map topology is not used, known, or otherwise unavailable. For example, the use of trajectory bundles to map an area can advantageously enable the trajectory reversal controller 121 to automatically map even open areas where there is no underlying road network based solely on the trajectory bundles. By way of example, these open areas include but are not limited to park areas with no paths, paths through an airspace used by aerial vehicles, public pedestrian spaces with no defined walk ways, etc.

In one embodiment, the trajectory reversal controller 121 uses the trajectory bundles to further analyze map data or other travel data associated with the geographic area. For example, the relative trajectory counts within each cluster (e.g., number of trajectories clustered or grouped into each trajectory bundle) can be used to indicate a travel characteristic such as a mode of transportation (e.g., driving, bicycling, pedestrians, etc.). In another embodiment, the relative trajectory counts can be used to distinguish typical/allowed maneuvers from atypical/non-allowed maneuvers. For example, a possible maneuver represented by a trajectory bundle with a relatively high trajectory count can be classified by the system trajectory reversal controller 121 to be a typical maneuver (e.g., a maneuver that a driver or traveler is typically expected to make in the bounded geographic area or at an intersection/interchange) or an allowed maneuver (e.g., a maneuver permitted by traffic rules based on an assumption that most drivers or travelers will perform only allowed maneuvers). On the other hand, the trajectory reversal controller 121 can classify a possible maneuver represented by a trajectory bundle with a relatively low trajectory count as an atypical (e.g., a maneuver a driver or traveler would not normally make at in an area or at an intersection/interchange) or a non-allowed maneuver (e.g., a maneuver not permitted by traffic rules based on an assumption that only a few drivers or travelers would break a traffic rule). These determination are improved by the increased number of trajectories available from trajectory reversal.

The trajectory reversal controller 121 may also include a traffic data generator that analyzes the clustered trajectories to determine traffic levels. The trajectory reversal controller 121 may output the traffic data 32 including the traffic levels to a traffic application, a mapping application, a navigation application or another external service 41.

The quantity of clusters improves the detection of traffic levels. The trajectory reversal controller 121 may also include a point of interest detector that uses the trajectory bundles to detect POIs in a geographic area or adjacent to an intersection/interchange if the area includes the feature. To detect a POI, for instance, the trajectory reversal controller 121 analyzes the topology of trajectory bundles with respect to the topology of a map feature such as roads within the geographic area of interest. For example, trajectory clusters that do not follow the topology of the road typically correspond to POIs adjacent to the road network (e.g., gas stations, stores with parking lots, etc.). In one embodiment, trajectory reversal controller 121 analyzes the bundle topology to detect specific deviations from the map topology such as (but not limited to) kinks, multiple self-intersections, etc. that may be indicative of POIs at or near the area of the detected deviations. The trajectory reversal controller 121 may also use the trajectory clusters to detect geographic areas that may be problematic for travelers or drivers (e.g., areas where driving may be confusing or susceptible to navigation errors such as missing a turn, making a wrong turn, etc.).

Figure 5:
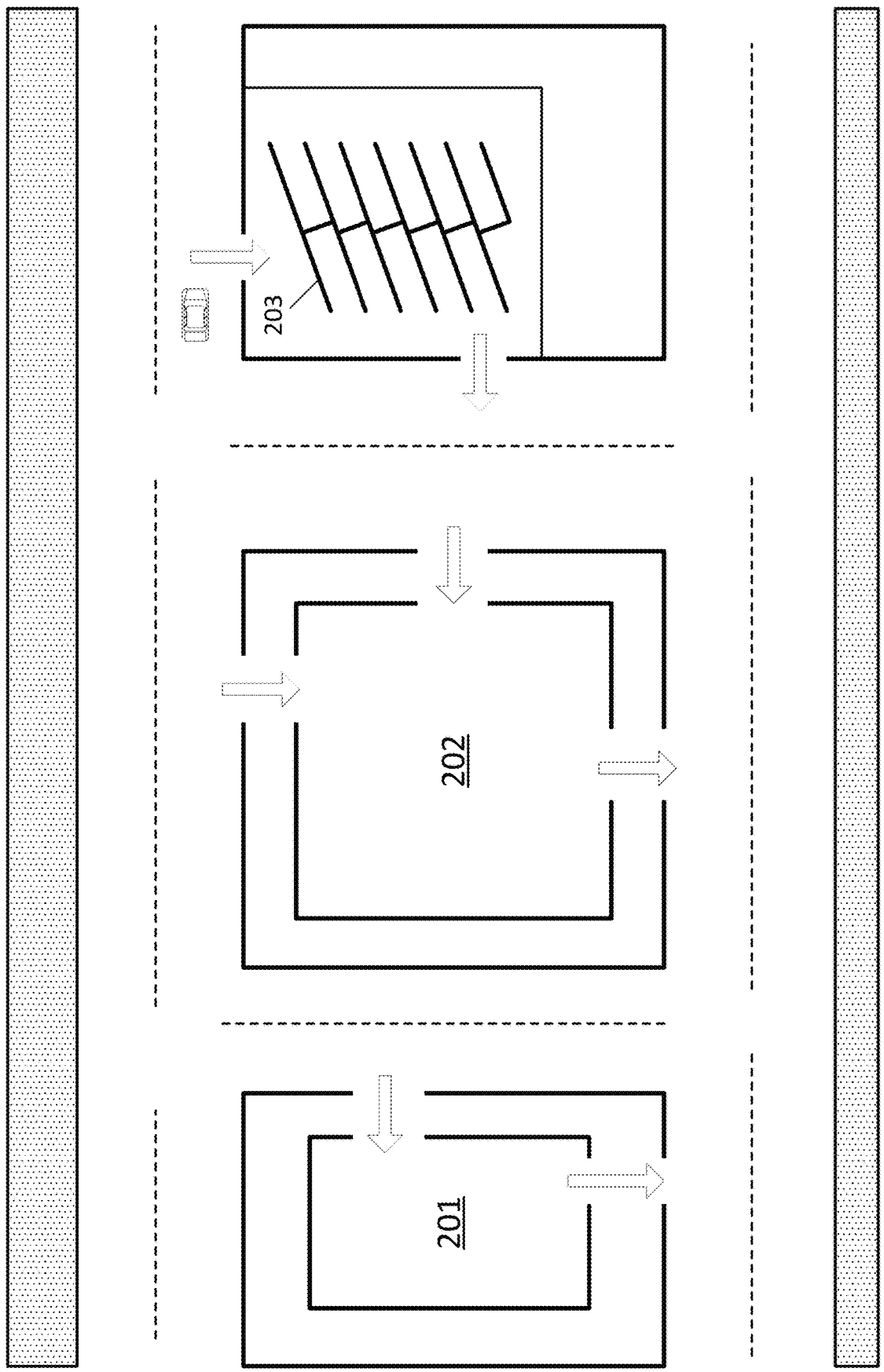
FIG. 5 illustrates example applications for the trajectory reversal.

FIG. 5 illustrates example applications for the trajectory reversal at various types of points of interest. FIG. 5 illustrates a point of interest 201 with an entrance separated from an exit. The term separated may mean that there is a distance between the entrance and exit that is greater than a predetermined distance (e.g., 10 meters, 100 meters, or another value) or that the trajectories associated with the entrance are distinguishable from the trajectories associated with the exit. The term separated may mean that the entrance and exit are associated with different road segments. The term separated may mean that the entrance and exit are associated with different sides of the point of interest 201.

A point of interest 202 is an example with multiple entrances that are separated from each other and also each separated from an exit to the point of interest 202. The point of interest 202 may be a parking garage. The point of interest 202 may be any point of interest (e.g., movie theater, shopping area, office building, apartment building, park or other facility) that includes a parking garage or parking area. The point of interest 202 may be any of these examples with at least a lane, ramp, or area for a vehicle to drive into the geographic area of the point of interest 202. The point of interest 202 may be any of these examples with at least a path for a pedestrian to enter onto the geographic area of the point of interest 202.

A point of interest 203 is a parking lot having parking spaces in a geographic area. The entrance and exit of the parking lot are separated. An entrance to the parking lot is associated with a first road segment and the exit to the parking lot is associated with a second road segment. As described above, for the trajectories entering a parking lot, if the trajectories are reversed with respect to the time order of the exiting trajectories, then the exiting trajectories would be similar to the entering trajectories under an order-constrained similarity measure. Using a similarity measure such as the Fréchet distance, a larger size entering cluster, increases the confidence of parking lot entrance detection.

In addition, it should be noted that reversing the time order of a trajectory does not make an order-constrained similarity measure lose its power of differentiating routes. In other words, if the two trajectories have very different routes and therefore have a large Fréchet distance, then reversing one of them will still lead to a large Fréchet distance.

The bi-directional similarity measure, or bi-directional Fréchet distance, may be defined according to the following. Let S be a metric space (e.g., $\mathbb{R}^2$). A curve A in S is a continuous map from the unit interval into S, i.e., A: [0,1]S. A reparameterization $\alpha$ of [0,1] is a continuous, non-decreasing, surjection $\alpha$: [0,1]→[0,1]. The reverse of A, denoted $\hat{A}$, is defined as $\hat{A}$: [0,1]→S such that $\hat{A}(x)=A(1-x)$ for any $x \in [0,1]$. Intuitively, the reverse of A has the identical geometric shape as A but the opposite direction.

For any two curves A and B in S, equation 1 provides the Fréchet distance. Let A and B be two curves in S where d is the distance function of S, and $\alpha(t)$ and $\beta(t)$ are reparameterizations of [0,1]. The Fréchet distance between A and B, denoted F(A, B), is defined as:

$$F(A, B) = \inf_{\alpha,\beta} \max_{t\in[0,1]} d(A(\alpha(t)), B(\beta(t))) \quad \text{Eq. 1}$$

The bi-directional similarity measure, or bi-directional Fréchet distance, is provided by Equation 2. Let A and B be two curves in S. The bi-directional Fréchet distance between A and B, denoted $B_iF(A, B)$, is defined as $$BiF(A,B)=\min(F(A,B),F(\hat{A},B)) \quad \text{Eq. 2}$$

In other words, the bi-directional Fréchet distance between A and B is the minimum of two distances, namely the Fréchet distance between A and B and the Fréchet distance between A's reverse and B. This means that the bi-directional Fréchet distance is small as long as A and B are similar in some direction combination. The following propositions justify why it is sufficient to consider A's reverse (instead of all direction combinations):

The reverse of a reparameterization $\alpha$ denoted $\hat{\alpha}$, is defined as $\hat{\alpha}$: [0,1]→[0,1] such that $\hat{\alpha}(x)=1-\alpha(1-x)$ for any $x \in [0,1]$. $\hat{\alpha}$ is also a reparameterization. Proposition 1: F(A, B)=F($\hat{A}$, $\hat{A}$). Proof: For any pair of reparameterizations $\alpha$ and $\beta$, the following equations hold for any $t \in [0,1]$:

$$A(\alpha(t)) = A(1 - \hat{\alpha}(1 - t)) = \hat{A}(\hat{\alpha}(1 - t))$$

$$B(\beta(t)) = B(1 - \hat{\beta}(1 - t)) = \hat{B}(\hat{\beta}(1 - t))$$

Thus, $$\max_{t\in[0,1]} d(A(\alpha(t)), B(\beta(t))) =$$

$$\max_{t\in[0,1]} d(\hat{A}(\hat{\alpha}(1 - t)), \hat{B}(\hat{\beta}(1 - t))) = \max_{t\in[0,1]} d(\hat{A}(\hat{\alpha}(t)), \hat{B}(\hat{\beta}(t)))$$

Consequently, $$\inf_{\alpha,\beta} \max_{t\in[0,1]} d(A(\alpha(t)), B(\beta(t))) \geq \inf_{\alpha,\beta} \max_{t\in[0,1]} d(\hat{A}(\alpha(t)), \hat{B}(\beta(t)))$$

Symmetrically, $$\inf_{\alpha,\beta} \max_{t\in[0,1]} d(\hat{A}(\alpha(t)), \hat{B}(\beta(t))) \geq \inf_{\alpha,\beta} \max_{t\in[0,1]} d(A(\alpha(t)), B(\beta(t)))$$

Therefore, $$\inf_{\alpha,\beta} \max_{t\in[0,1]} d(A(\alpha(t)), B(\beta(t))) = \inf_{\alpha,\beta} \max_{t\in[0,1]} d(\hat{A}(\alpha(t)), \hat{B}(\beta(t)))$$

Proposition 2: F($\hat{A}$, B)=F(A, $\hat{B}$). Proof: Observe that $\hat{\hat{A}}$=A. According to Proposition 1, $$F(\hat{A},B)=F(\hat{\hat{A}},\hat{B})=F(A, \hat{B})$$

Figure 6:
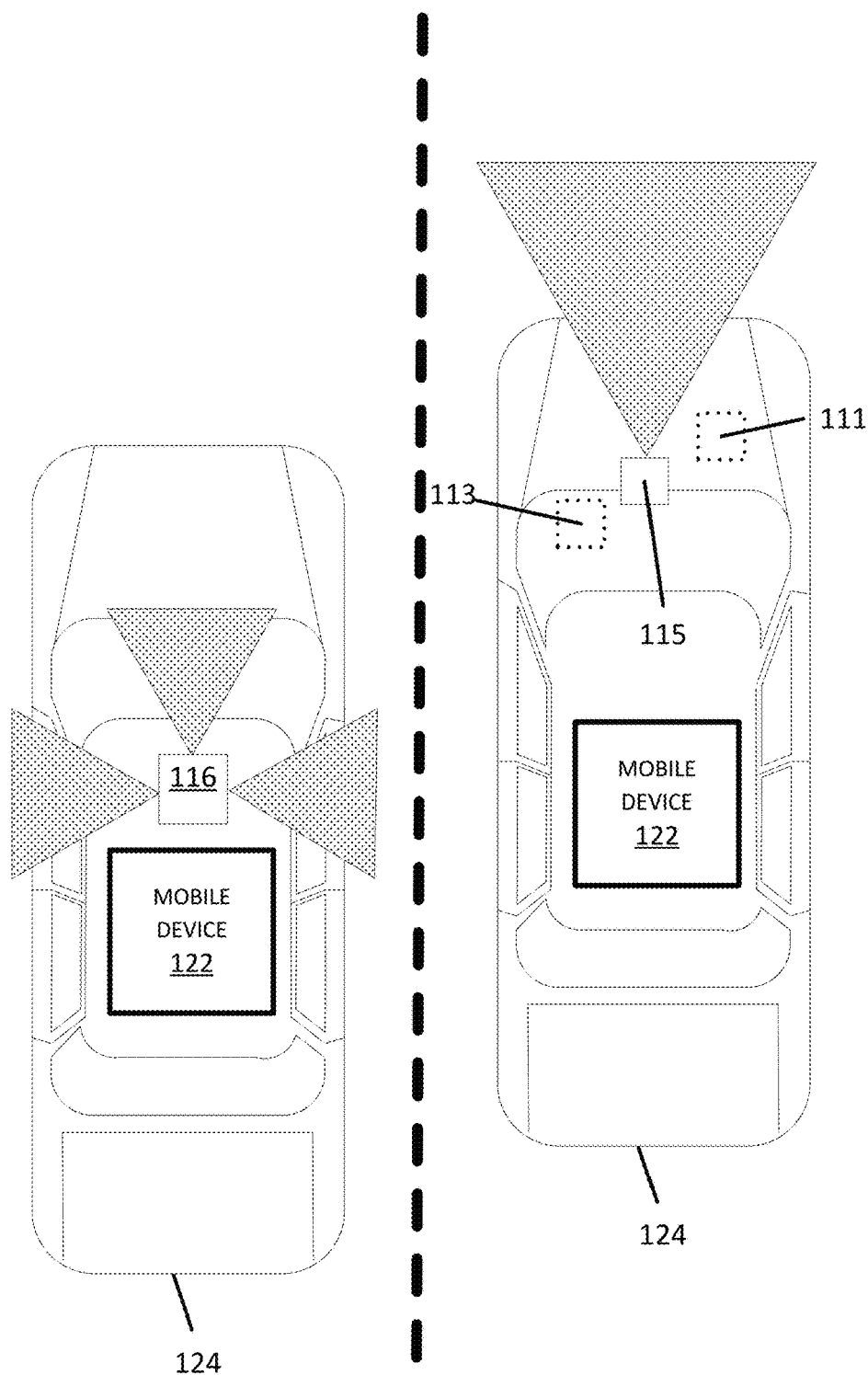
FIG. 6 illustrates an exemplary vehicle of the systems of FIGS. 1-5.

FIG. 6 illustrates an exemplary vehicle 124 of the systems of FIGS. 1-5. The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order according to driving commands or navigation commands and may respond to geographic data received from geographic database 123 that was detected according to an improved cluster of trajectories including one or more reversed trajectories.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands. The geographic data may be derived from an improved cluster of trajectories including one or more reversed trajectories.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands. The geographic data may be derived from an improved cluster of trajectories including one or more reversed trajectories.

Figure 7:
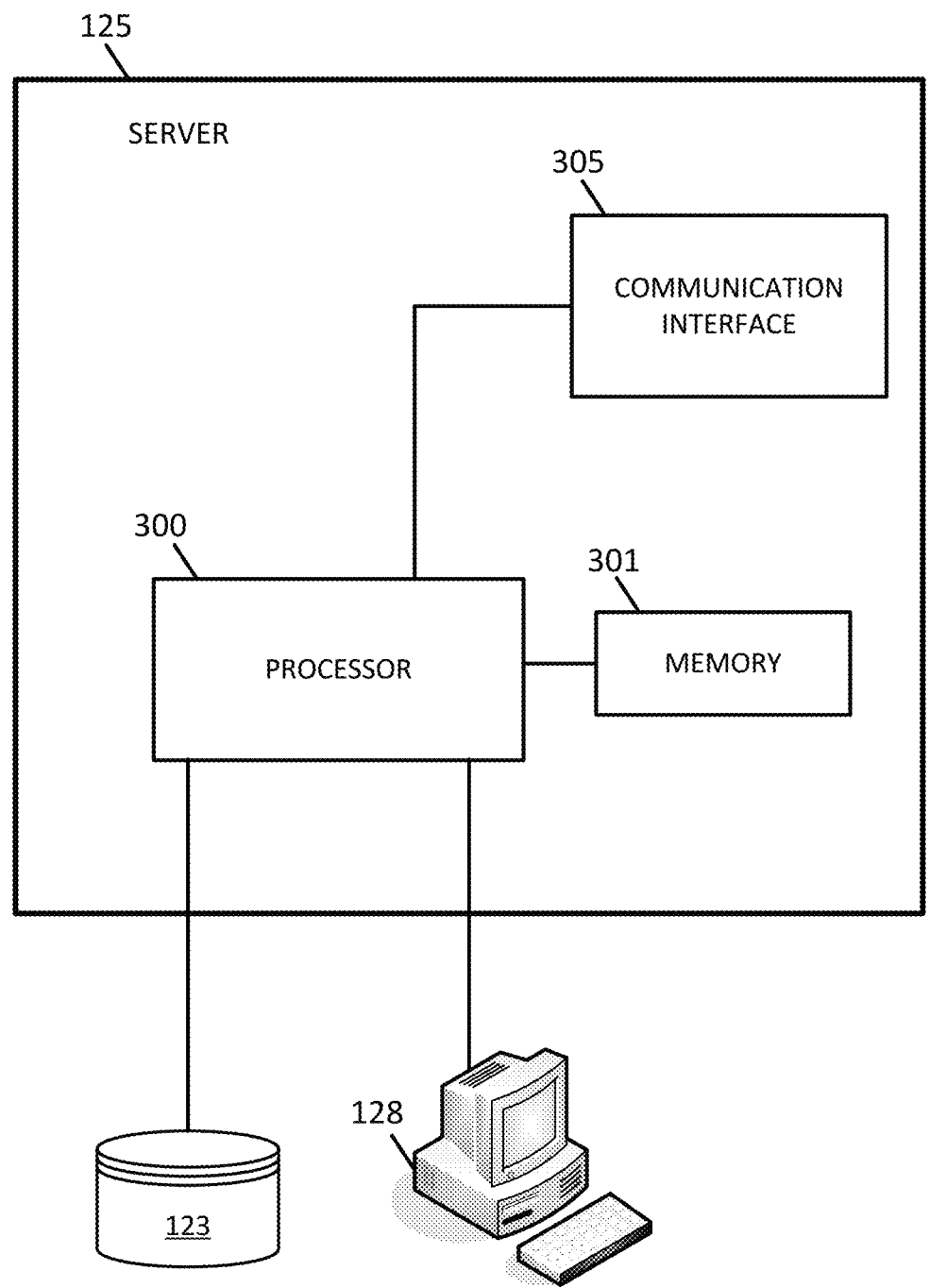
FIG. 7 illustrates an example server.

FIG. 7 illustrates an example server 125, which may apply to the system of FIG. 1. The server 125 includes a processor 300, a communication interface 305, a memory 301, and a database 123. The processor 300 may implement the functions associated with the probe data receiver 37, the reverse trajectory generator 38, and the clustering calculator 39. The memory 301 may store the map data 31, the traffic data 32, the probe data 33, and the anonymization table 34. The communication interface 305 may facilitate the receipt of the probe data 33 from the probes 101a-n as well as provide the modified probe data 40 to the external device 41. An input device (e.g., keyboard or personal computer 128) may be used to enter settings to the server 125. The settings may include settings for the trajectory reversal. The settings for the trajectory reversal may include default thresholds for the quantity of trajectories as well as the geographic regions for which trajectories are reversed. The settings for the anonymity settings or thresholds. Additional, different, or fewer components may be provided in the server 125.

Figure 8:
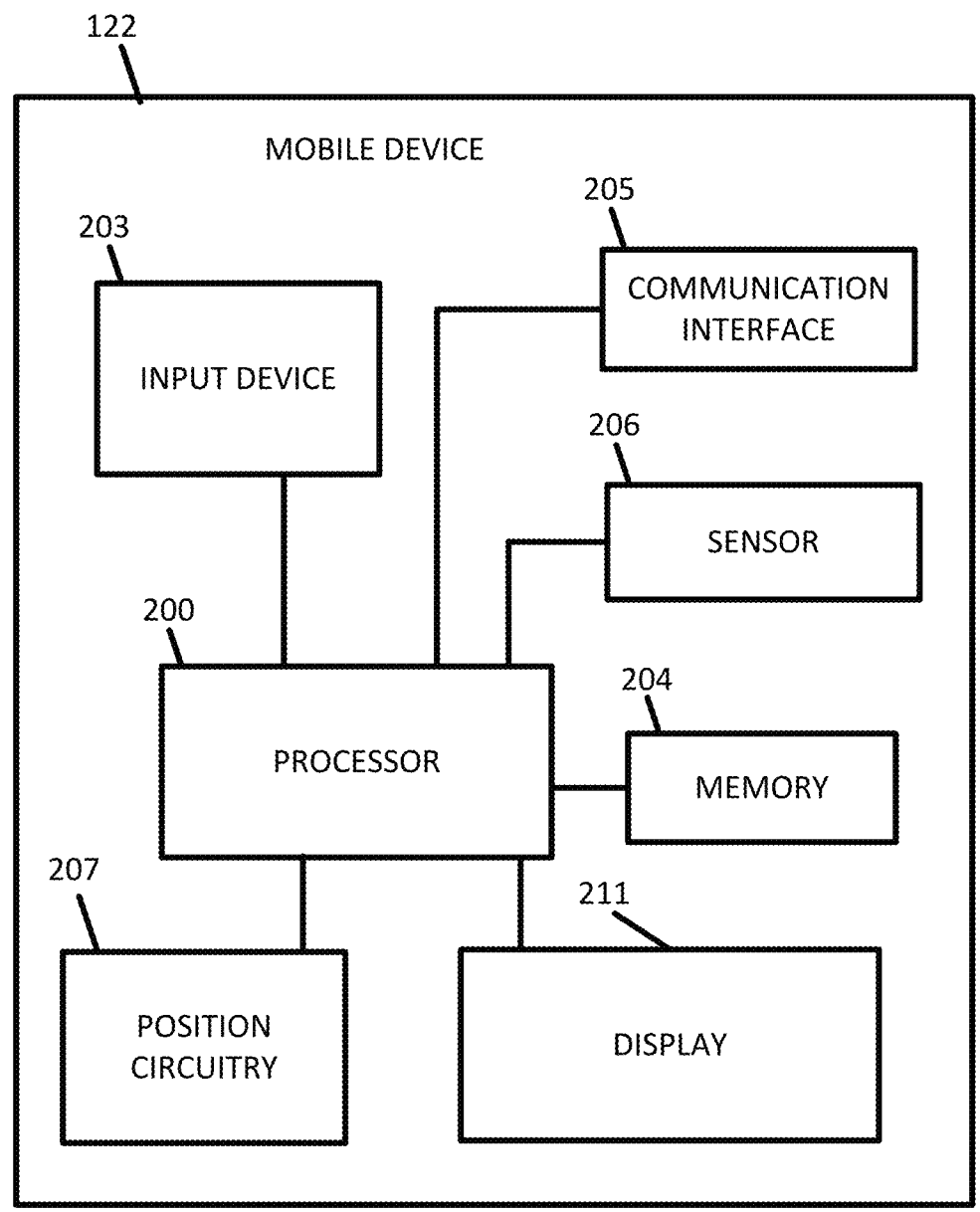
FIG. 8 illustrates an example mobile device.

FIG. 8 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the trajectory reversal.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 9:
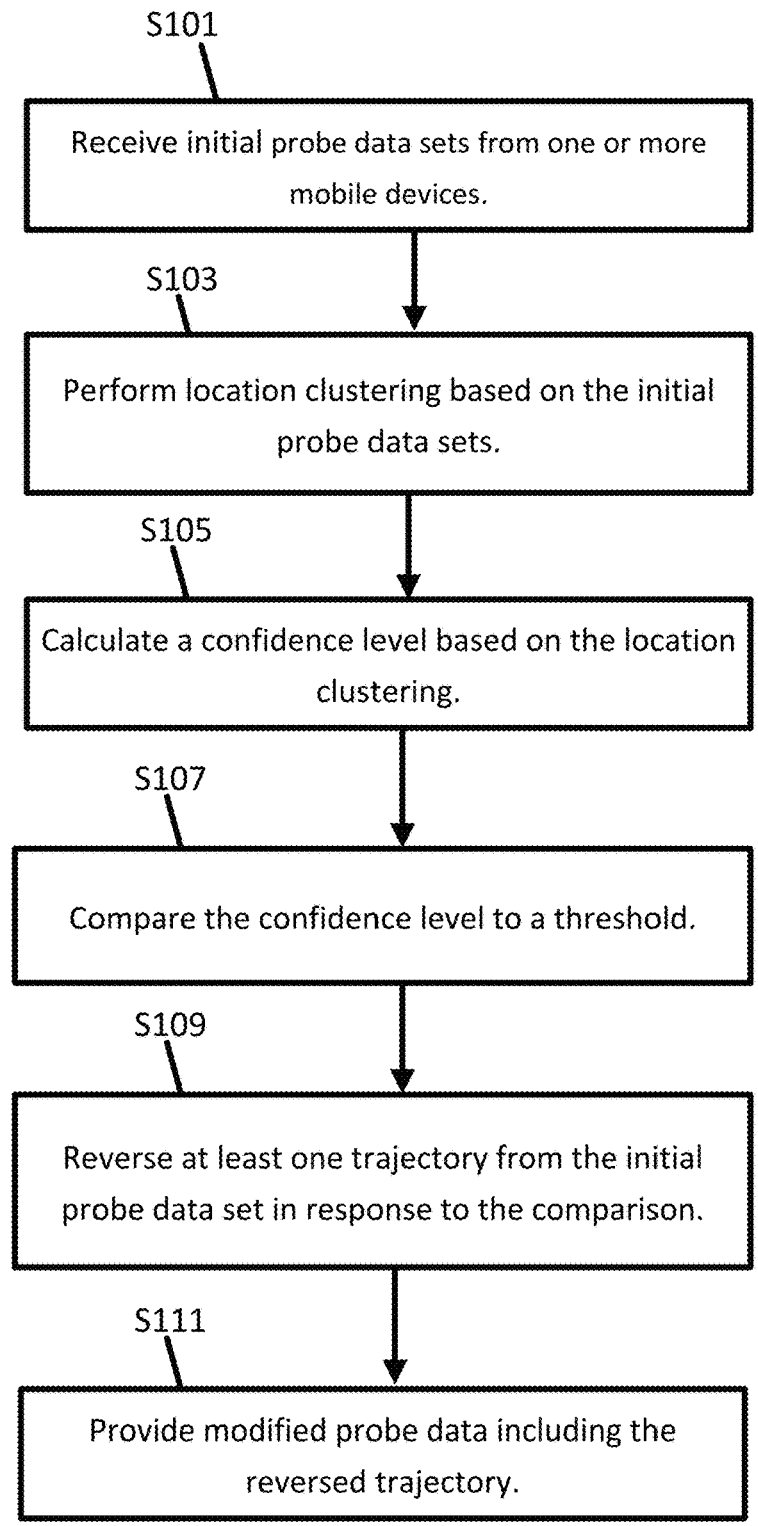
FIG. 9 illustrates an example flowchart for the mobile device of FIG. 8.

FIG. 9 illustrates an example flowchart for the operation of the server 125 with respect to trajectory reversals of trajectories determined at one or more collection devices including mobile device 122. Additional, different, or fewer acts may be provided.

At act S101, the communication interface 305 receives multiple probe data sets from one or more collection devices including at least mobile device 122. In one example, the probe data sets may include location data determined by the position circuitry 207. In another example, the probe data sets include the location data paired with time values that may be determined by the processor 200, or at the position circuitry 207.

The communication interface 305 is one example means for receiving multiple probe data sets from one or more collection devices. The processor 300 may also include circuitry serving as means for receiving multiple probe data sets from one or more collection devices.

The position circuitry 207 or the processor 200 detects a geographic position of the mobile device 122 or the vehicle 124. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include distancing sensors, range sensor, image sensors, or another sensor as described with respect to FIG. 6 may also provide information for determining the geographic position of the mobile device 122.

At act S103, the processor 300 performs a clustering algorithm on the probe data sets. In clustering, the processor 300 may determine a distance between pairs of the probe data sets. The distance may be aggregate distance that is a combination of distances between individual pairs of probe data points. The distance may be the smallest distance of the distances between individual pairs of the probe data points. The processor 300 identifies at least one cluster of the probe data sets based on the clustering algorithm. The processor 300 may also include circuitry serving as means for performing a clustering algorithm on the probe data sets At act S105, the processor 300 calculates a confidence level based on a result of the location clustering algorithm. The confidence level may be calculated from the deviation between the probe data sets in the cluster. The confidence level may be proportional to how tightly packed the probe data sets are in the cluster. Tightly spaced probe data sets may correspond to a high confidence level. Loosely spaced probe data sets may correspond to a low confidence level. The processor 300 may also include circuity serving as means for calculating a confidence level.

At act S107, the processor 300 may compare the confidence level to a threshold level. The threshold level may be selected based on the application for the clusters. Example applications, as described herein, may include map feature identification and anonymization. The map feature identification application may require a first confidence level and the anonymization application may require a second confidence level. The processor 300 may also include circuitry serving as means for comparing the confidence level to a threshold level.

At act S109, the processor 300 may reverse at least one trajectory from the initial probe data set in response to the comparison. That is, when the confidence level of the cluster of probe data sets is less that the threshold level, the processor 300 modifies at least one of the trajectory. The processor may reverse the location values or the time values such that the modified probe data set includes values in a reverse order. In one example, the trajectory includes four pairs of location values and time values, a first pair, a second pair, a third pair, and a fourth pair. The processor 300 may reverse the order so that the first time value is paired with the fourth location value, the second time value is paired with the third location value, the third time value is paired with the second location value, and the fourth time value is paired with the first location value. The processor 300 may also include circuitry serving as means for reversing at least one trajectory from the initial probe data set in response to the comparison At act S111, the communication interface 305 or the processor 300 provides modified probe data including the reversed trajectory. The modified probe data may be provided to an external device or service. The modified probe data may be provided to a map feature identification system that analyzes the modified probe data to determine one or more map features related to road segments, intersections, turns or place locations. The modified probe data may be provided to an anonymization system that protects the identity of the probe data sets by masking one or more identification values. The increased number of trajectories created through trajectory reversal helps to reduce the chance that any individual probe data set can be identified from the cluster. For example, the anonymization may assign pseudonyms to the trajectories, which may include the original probe data and the modified probe data. By increasing the number of trajectories that are anonymized with pseudonyms, the overall anonymity of the data set is increased. In one example, the trajectories derived from reversing the initial probe data are defined as dummy trajectories (i.e., trajectories generated for the purpose of increasing anonymity).

The communication interface 305 may be a means for providing modified probe data including the reversed trajectory. The processor 300 may also include circuitry serving as means for providing modified probe data including the reversed trajectory.

The processor 200 may include a routing module including an application specific module or processor that calculates routing between an origin and destination. The routing module is an example means for generating a route. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the mix zone.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 10:
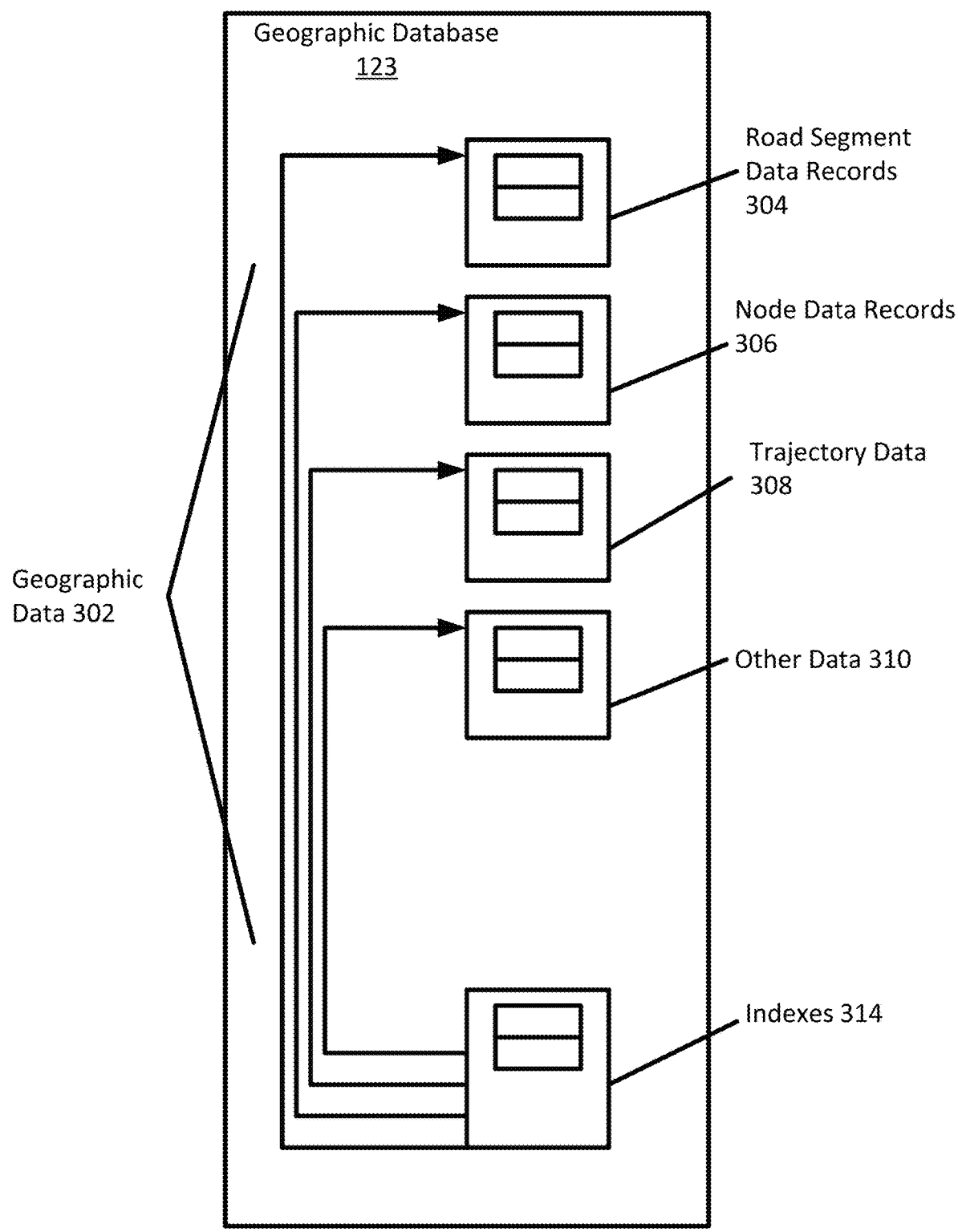
FIGS. 10 and 11 illustrate example geographic databases.

In FIG. 10, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate trajectory data 308 with a road segment in the segment data records 304 or a geographic coordinate. An index 314 may, for example, store trajectory data 30, which may include original trajectories detected by the probes or reversed trajectories generated by the trajectory reversal controller.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 11:
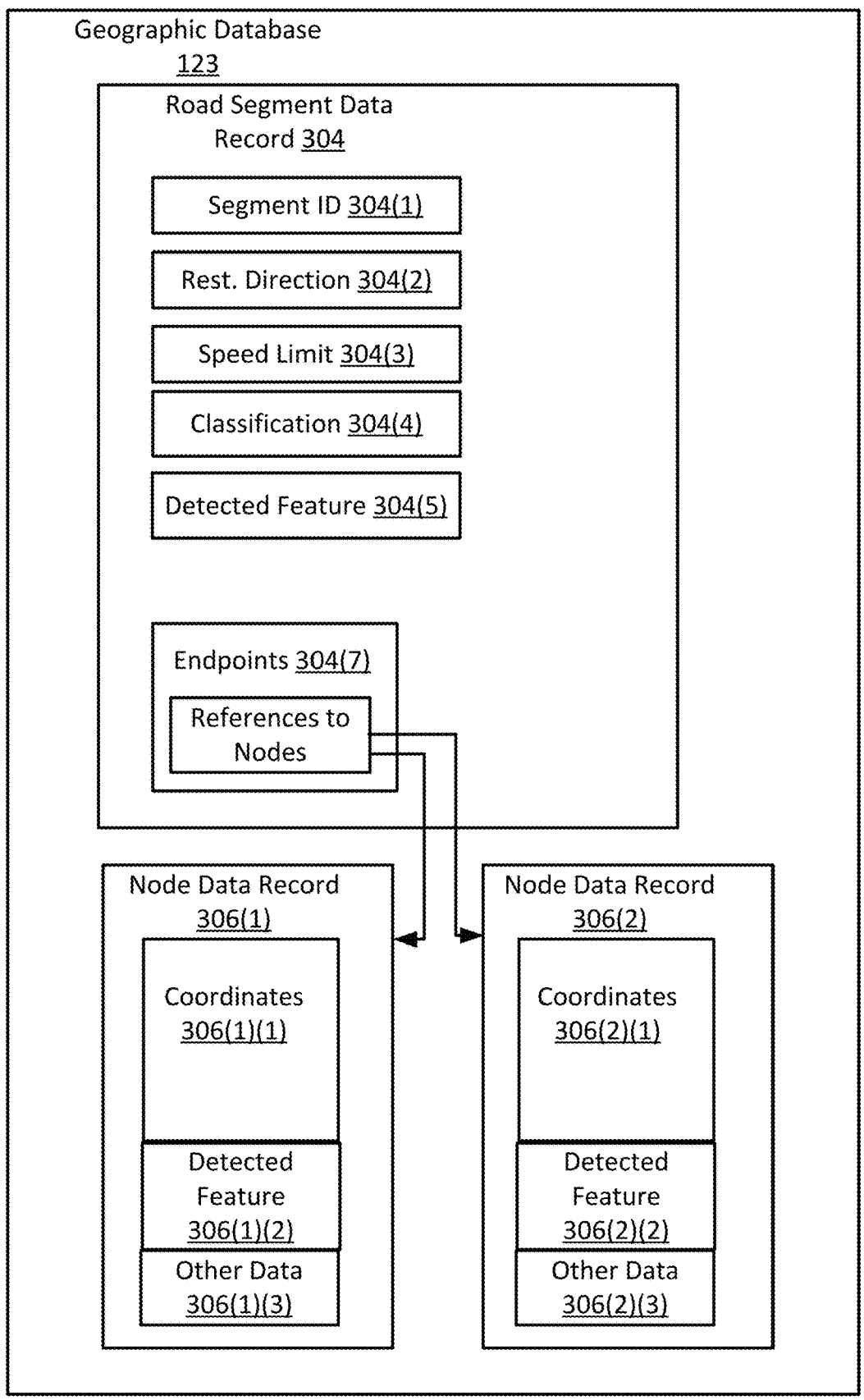

FIG. 11 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features 304(5) that are detected based on the trajectory clusters including at least one reversed trajectory. The features 304(5) may include the locations of turns or places along the road segment. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 11 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and detected feature data 306 (1)(2) and 306(2)(2), which may indicate the size or boundaries of the intersection as determined from the cluster of trajectories include at least one reversed trajectory. The detected feature data 306(1)(2) and 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for providing trajectory data for a geographic area, the method comprising:

receiving a plurality of probe data sets from one or more mobile devices, wherein the probe data sets include time values in a first sequence associated with location values in the first sequence;

modifying, using a processor, at least one of the plurality of probe data sets to reverse the location values or the time values such that the modified probe data set includes time values in a first sequence associated with location values in a second sequence; and performing, using the processor, a location clustering algorithm on the plurality of probe data sets and the modified probe data set according to the location values.

Embodiment 2

The method of embodiment 1, further comprising:

performing, initially, the location clustering algorithm on the plurality of probe data sets; and calculating a confidence level based on a result of the location clustering algorithm.

Embodiment 3

The method of any of embodiments 1 and 2, further comprising:
  comparing the confidence level to a threshold; and
  in response to the confidence level being less than the threshold, generating an instruction to modify at least one of the plurality of probe data sets to reverse the location values or the time values.

Embodiment 4

The method of any of embodiments 1-3, further comprising:
  calculating an improved confidence level based on the location clustering algorithm on the plurality of probe data sets and the modified probe data set.

Embodiment 5

The method of any of embodiments 1-4, wherein the improved confidence level is greater than the confidence level.

Embodiment 6

The method of any of embodiments 1-5, further comprising:
  determining a geographic area associated with at least one of the plurality of probe data sets; and
  in response to the geographic area being designated for trajectory reversal, generating an instruction to modify at least one of the plurality of probe data sets to reverse the location values or the time values.

Embodiment 7

The method of any of embodiments 1-6, wherein the first sequence is opposite the second sequence.

Embodiment 8

The method of any of embodiments 1-7, further comprising:
  providing trajectories including the probe data sets and the modified probe data set.

Embodiment 9

The method of any of embodiments 1-8, further comprising:
  assigning pseudonyms to the trajectories including the plurality of probe data sets and the modified probe data set, wherein anonymization of the plurality of probe data sets is increased by the modified probe data set.

Embodiment 10

The method of any of embodiments 1-9, further comprising:
  defining at least one dummy trajectory from the modified probe data set.

Embodiment 11

The method of any of embodiments 1-10, further comprising:
  generate a map feature in response to the trajectories including the plurality of probe data sets and the modified probe data set; and
  storing the map feature in a geographic database.

Embodiment 12

The method of any of embodiments 1-11, wherein the plurality of probe data sets correspond to an entrance of a point of interest and the modified probe data set corresponds to an exit of the point of interest.

Embodiment 13

The method of any of embodiments 1-12, wherein the point of interest is a parking facility.

Embodiment 14

An apparatus, configured to perform and/or control the method of any of embodiments 1-13 or comprising means for performing and/or controlling any of embodiments 1-13.

Embodiment 15

An apparatus, comprising at least one processor and at least one memory including computer program code for one or more programs, the at least one memory and the computer program code configured to, with the at least one processor, to perform and/or control the method of any of embodiments 1-13.

Embodiment 16

A computer program comprising instructions operable to cause a processor to perform and/or control the method of any of embodiments 1-13, when the computer program is executed on the processor.

We claim:

1. A method for providing trajectory data for a geographic area, the method comprising:
  receiving a plurality of probe data sets from one or more mobile devices corresponding to a geographic area traversed by the one or more mobile devices, wherein the probe data sets include time values determined by the one or more mobile devices in a first sequence associated with location values determined by the one or more mobile devices and comprising locations of the one or more mobile devices in the first sequence;
  modifying, using a processor, at least one of the plurality of probe data sets to reverse the location values comprising the locations of the one or more mobile devices in the first sequence or the time values in the first sequence such that the modified probe data set includes the time values in the first sequence associated with the location values comprising the locations of the one or more mobile devices in a second sequence, or such that the modified probe data set includes the time values in the second sequence associated with the location values comprising the locations of the one or more mobile devices in the first sequence;
  performing, using the processor, a location clustering algorithm on the plurality of probe data sets and the modified probe data set according to the location values comprising the locations of the one or more mobile devices; and
  providing, to a geographic database, geographic data based on the probe data sets and the modified probe data set, wherein the one or more mobile devices receive the geographic data from the geographic database and generate a navigation command or a driving command based on the geographic data.

2. The method of claim 1, further comprising:
performing, initially, the location clustering algorithm on the plurality of probe data sets; and
calculating a confidence level based on a result of the location clustering algorithm.

3. The method of claim 2, further comprising:
comparing the confidence level to a threshold; and
in response to the confidence level being less than the threshold, generating an instruction to modify at least one of the plurality of probe data sets to reverse the location values or the time values.

4. The method of claim 3, further comprising:
calculating an improved confidence level based on the location clustering algorithm on the plurality of probe data sets and the modified probe data set.

5. The method of claim 4, wherein the improved confidence level is greater than the confidence level.

6. The method of claim 1, further comprising:
determining a geographic area associated with at least one of the plurality of probe data sets; and
in response to the geographic area being designated for trajectory reversal, generating an instruction to modify at least one of the plurality of probe data sets to reverse the location values or the time values.

7. The method of claim 1, wherein the first sequence is opposite the second sequence.

8. The method of claim 1, further comprising:
assigning pseudonyms to trajectories including the plurality of probe data sets and the modified probe data set, wherein anonymization of the plurality of probe data sets is increased by the modified probe data set.

9. The method of claim 1, further comprising:
defining at least one dummy trajectory from the modified probe data set.

10. The method of claim 1, further comprising:
generate a map feature in response to trajectories including the plurality of probe data sets and the modified probe data set; and
storing the map feature in the geographic database.

11. The method of claim 1, wherein the plurality of probe data sets correspond to an entrance of a point of interest and the modified probe data set corresponds to an exit of the point of interest.

12. The method of claim 11, wherein the point of interest is a parking facility.

13. An apparatus for providing trajectory data for a geographic area, the apparatus comprising:
a probe data receiver configured to identify a plurality of probe data sets from one or more mobile devices corresponding to a geographic area traversed by the one or more mobile devices, wherein the probe data sets include time values determined by the one or more mobile devices in a first sequence associated with location values determined by the one or more mobile devices and comprising locations of the one or more mobile devices in the first sequence;
a reverse trajectory generator configured to modify at least one of the plurality of probe data sets to reverse the location values comprising the locations of the one or more mobile devices in the first sequence such that the modified probe data set includes the time values in the first sequence associated with the location values comprising the locations of the one or more mobile devices in a second sequence;
a map feature generator configured to generate a map feature in response to trajectories including the plurality of probe data sets and the modified probe data set; and
a geographic database configured to receive geographic data based on the probe data sets and the modified probe data set,
wherein the one or more mobile devices receive the geographic data from the geographic database and generate a navigation command or a driving command based on the geographic data.

14. The apparatus of claim 13, further comprising:
a clustering calculator configured to perform a location clustering algorithm on the plurality of probe data sets and the modified probe data set according to the location values,
wherein the clustering calculator is configured to initially perform the location clustering algorithm on the plurality of probe data sets and calculate a confidence level based on a result of the location clustering algorithm.

15. The apparatus of claim 14, wherein the clustering calculator is configured to compare the confidence level to a threshold, and in response to the confidence level being less than the threshold, generating an instruction for the reverse trajectory generator to modify at least one of the plurality of probe data sets to reverse the location values.

16. The apparatus of claim 13, wherein the first sequence is opposite the second sequence.

17. The apparatus of claim 13, further comprising:
an anonymity generator configured to assign identifiers to the trajectories including the probe data sets and the modified probe data set, wherein anonymization of the plurality of probe data sets is increased by the modified probe data set.

18. A non-transitory computer readable medium including instructions that when executed by a process perform a method comprising:
receiving initial trajectories of one or more mobile devices having time values determined by the one or more mobile devices associated with location values determined by the one or more mobile devices and comprising locations of the one or more mobile devices;
performing a location clustering algorithm on the initial trajectories of the one or more mobile devices;
calculating a confidence level of a cluster describing a geographic area traversed by the one or more mobile devices based on a result of the location clustering algorithm;
performing a comparison of the calculated confidence level of the cluster to a threshold to indicate whether the cluster adequately describes the geographic area traversed by the one or more mobile devices;
modifying, in response to the comparison, at least one of the initial trajectories of the one or more mobile devices to reverse the location values comprising the locations of the one or more mobile devices or the time values in a reversed trajectory of the one or more mobile devices;
providing the initial trajectories of the one or more mobile devices and the reversed trajectory of the one or more mobile devices; and
providing, to a geographic database, geographic data based on at least the reversed trajectory, wherein the one or more mobile devices receive the geographic data from the geographic database and generate a navigation command or a driving command based on the geographic data.

* * * * *